US012650130B1

(12) United States Patent
Peng

(10) Patent No.: US 12,650,130 B1
(45) Date of Patent: Jun. 9, 2026

(54) HANDLE DEVICE WITH EASILY ASSEMBLED POWER SUPPLY AND PORTABLE DUST REMOVAL DEVICE

(71) Applicant: Dongguan Mengqiqi Digital Co., Ltd., Dongguan (CN)

(72) Inventor: Shuguang Peng, Anqing (CN)

(73) Assignee: Dongguan Mengqiqi Digital Co., Ltd., Dongguan (CN)

( * ) Notice: Subject to any disclaimer, the term of this patent is extended or adjusted under 35 U.S.C. 154(b) by 0 days.

(21) Appl. No.: 19/373,786

(22) Filed: Oct. 30, 2025

(30) Foreign Application Priority Data

Oct. 13, 2025 (CN) ......................... 202522170542.X

(51) Int. Cl.
| | |
|---|---|
| *F04D 29/40* | (2006.01) |
| *B08B 5/00* | (2006.01) |
| *F04D 25/06* | (2006.01) |
| *F04D 25/08* | (2006.01) |
| *F04D 29/52* | (2006.01) |
| *F04D 29/64* | (2006.01) |

(Continued)

(52) U.S. Cl.
CPC .............. *F04D 25/084* (2013.01); *B08B 5/00* (2013.01); *F04D 25/0673* (2013.01); *F04D 29/403* (2013.01); *F04D 29/52* (2013.01); *F04D 29/64* (2013.01); *H01M 50/166* (2021.01); *H01M 50/20* (2021.01)

(58) Field of Classification Search
CPC ....... B08B 5/00; H01M 50/166; H01M 50/20; F04D 25/0673; F04D 25/084; F04D 29/403; F04D 29/52; F04D 29/64
See application file for complete search history.

(56) References Cited

U.S. PATENT DOCUMENTS

| | | | |
|---|---|---|---|
| 6,730,432 B1 * | 5/2004 | Grosfeld ............... | H01M 50/50 |
| | | | 206/703 |
| 6,898,074 B2 * | 5/2005 | Hsu ........................ | G06F 1/1656 |
| | | | 429/96 |

(Continued)

FOREIGN PATENT DOCUMENTS

| | | |
|---|---|---|
| CN | 109793457 A | 5/2019 |
| CN | 219229734 U | 6/2023 |
| CN | 219922420 U | 10/2023 |

*Primary Examiner* — Andrew J Marien

(74) *Attorney, Agent, or Firm* — JEEN IP LAW, LLC

(57) ABSTRACT

A handle device with an easily assembled power supply and a portable dust removal device are provided. The handle device includes a main housing and a cover plate, the main housing is internally provided with a power supply compartment configured to accommodate a power supply, an opening communicating with the power supply compartment and the main housing is formed on the main housing, a first clasping assembly is disposed on the cover plate, and a second clasping assembly cooperating with the first clasping assembly is disposed on the power supply compartment. A first positioning-fixing interlocking assembly is disposed on the opening, and a second positioning-fixing interlocking assembly is correspondingly disposed on the cover plate. The opening is disposed on a side portion of the handle device, such that the power supply may be installed or removed without need to flip the handle device, which significantly enhances the operation convenience.

9 Claims, 7 Drawing Sheets

(51) Int. Cl.
　　H01M 50/166 　　(2021.01)
　　H01M 50/20 　　(2021.01)

(56) 　　　　　References Cited

U.S. PATENT DOCUMENTS

| | | | | |
|---|---|---|---|---|
| 7,065,389 | B2 * | 6/2006 | Kim ................... | H01M 50/244 |
| | | | | 379/433.08 |
| 8,556,303 | B2 * | 10/2013 | Rajagopal .......... | H04M 1/0262 |
| | | | | 292/228 |
| 8,586,225 | B1 * | 11/2013 | Bausch ............... | H04B 1/3883 |
| | | | | 429/97 |
| 8,663,826 | B2 * | 3/2014 | Lu ...................... | H01M 50/597 |
| | | | | 429/97 |
| 2005/0210624 | A1 * | 9/2005 | Lammers .................. | A47L 9/22 |
| | | | | 15/344 |
| 2011/0076523 | A1 * | 3/2011 | Iwamoto .............. | G06F 1/1658 |
| | | | | 429/96 |
| 2011/0305934 | A1 * | 12/2011 | Chang ................ | H01M 50/271 |
| | | | | 429/100 |
| 2024/0001797 | A1 * | 1/2024 | Lee ......................... | B60L 53/80 |

* cited by examiner 131    13

14

141

HANDLE DEVICE WITH EASILY ASSEMBLED POWER SUPPLY AND PORTABLE DUST REMOVAL DEVICE

CROSS-REFERENCE TO RELATED APPLICATIONS

The application claims priority to Chinese patent application No. 202522170542.X, filed on Oct. 13, 2025, the entire contents of which are incorporated herein by reference.

TECHNICAL FIELD

The present disclosure relates to the technical field of cleaning equipment, and in particular to a handle device with an easily assembled power supply and a portable dust removal device.

BACKGROUND

In daily cleaning scenarios, portable dust removal devices are widely used due to operation flexibility and strong applicability. As a core component for human-machine interaction, a handle device not only needs to meet comfort requirements for gripping, but also needs to provide stable power support for the dust removal device. The convenience of installing a built-in power supply and the reliability of connection directly determine the overall user experience of the dust removal device.

An opening of a power supply compartment in a handle of a portable dust removal device in the prior art is mostly formed at a bottom of the handle. This design has obvious limitations in practical use: A user needs to flip or invert the entire dust removal device to replace the power supply, and especially when the dust removal device is in an operational state or in a narrow space of cleaning, an operation at the opening of the bottom is extremely inconvenient, which not only increases the assembly difficulty but also may cause the dust removal device to slip due to unstable force application with hands.

Moreover, the power supply compartment with the bottom opening generally lacks an effective positioning and guiding structure. During the insertion, the power supply easily tilts due to sight blocking or butt-joint misalignment, which not only requires repeated adjustments to complete the assembly but also may cause misalignment and wear of a power supply interface and contacts in the power supply compartment, affect the stability of power transmission, and even shorten the service life of the power supply and the dust removal device after long-term use. Therefore, in view of the deficiencies in assembly convenience and butt-joint precision of the power supply compartment at the bottom of the handle, there is an urgent need for a structural design that optimizes the opening position and enhances the assembly stability.

SUMMARY

A main objective of the present disclosure is to provide a handle device with an easily assembled power supply and a portable dust removal device, so as to solve the problems of insufficient convenience of power supply assembly in a handle, insufficient connection stability, and insufficient positioning precision.

To achieve the above objective, the present disclosure provides a handle device with an easily assembled power supply, and the handle device includes:

a main housing, where the main housing is internally provided with a power supply compartment configured to accommodate a power supply, and an opening communicating with the power supply compartment and an exterior of the main housing is formed on a side portion of the main housing;

a cover plate configured to cover the opening, where a first clasping assembly is disposed on a side of the cover plate facing the opening, a second clasping assembly cooperating with the first clasping assembly is disposed on an inner wall surface of the power supply compartment close to the opening, and the cover plate and the main housing are detachably connected by means of clasping engagement between the first clasping assembly and the second clasping assembly; and a first positioning-fixing interlocking assembly is disposed on an end face of the opening facing the cover plate, a second positioning-fixing interlocking assembly is correspondingly disposed on a side of the cover plate facing the opening, the first positioning-fixing interlocking assembly and the second positioning-fixing interlocking assembly form a guiding fit during the clasping engagement between the first clasping assembly and the second clasping assembly, and stability of connection between the first clasping assembly and the second clasping assembly is enhanced after the clasping engagement.

A portable dust removal device includes a dust removal assembly, an air-blowing assembly, and the above handle device, where the air-blowing assembly is electrically connected to the dust removal assembly, the handle device is located at a bottom of the air-blowing assembly, the handle device is electrically connected to the air-blowing assembly and the dust removal assembly, and the dust removal assembly achieves dust removal through air blowing by the air-blowing assembly.

The beneficial effects of the present disclosure are as follows: the opening of the power supply compartment is formed on a side portion of the main housing; compared with the traditional bottom opening design, the power supply may be installed or removed without need to flip the handle device, which significantly enhances the operation convenience; secondly, the cover plate and the main housing are detachably connected through the first clasping assembly and the second clasping assembly, which prevents the cumbersome operation of fixing by screws; and additionally, in combination with the first positioning-fixing interlocking assembly and the second positioning-fixing interlocking assembly, precise guidance is formed during the clasping engagement, which ensures the clasping engagement in place, enhances overall connection stability after the clasping engagement, effectively prevents loosening or detachment of the cover plate, reduces assembly wear caused by assembly misalignment, and prolongs the service life.

BRIEF DESCRIPTION OF DRAWINGS

In order to more clearly describe the technical solutions in the embodiments of the present disclosure or in the prior art, a brief introduction to the accompanying drawings required for the description of the embodiments or the prior art will be made below. Apparently, the accompanying drawings in the following description are merely some embodiments of the present disclosure, and those of ordinary skill in the art would also be able to derive other drawings from the structures illustrated in these drawings without making creative efforts.

REFERENCE NUMERALS IN FIGURES

Figure 1:
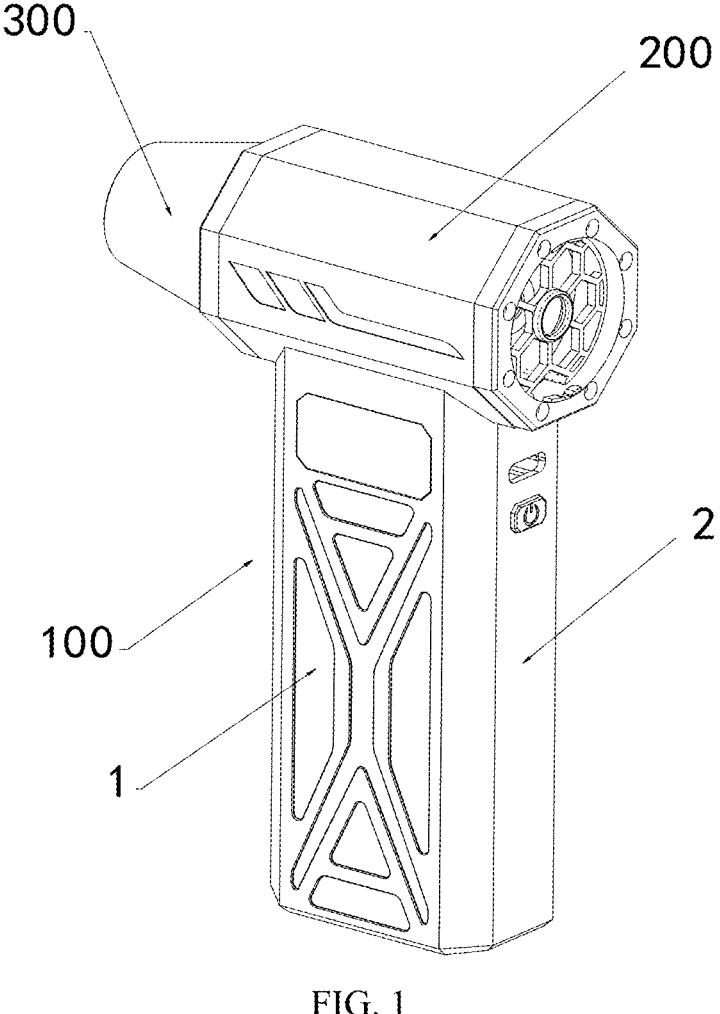
FIG. 1 is a schematic diagram of a three-dimensional structure of a portable dust removal device according to the present disclosure.

100—handle device; 200—air-blowing assembly; 300—dust removal assembly; 400—power supply; 1—main housing; 11—power supply compartment; 12—clasping groove; 13—positioning-fixing block; 131—second inclined guide surface; 14—positioning block; 141—third inclined guide surface; 15—bearing plate; 16—limiting plate; 2—cover plate; 21—clasping block; 211—first inclined guide surface; 22—positioning-fixing groove; 23—positioning plate; 231—positioning groove; and 232—fourth inclined guide surface.

The realization of the objective, functions, features and advantages of the present disclosure, will be further explained in combination with the embodiments and drawings.

DETAILED DESCRIPTION OF THE EMBODIMENTS

The technical solutions in the embodiments of the present disclosure will be clearly and completely described below in combination with the accompanying drawings in the embodiments of the present disclosure. Apparently, the embodiments described are merely some rather than all of the embodiments of the present disclosure. Based on the described embodiments of the present disclosure, all other embodiments acquired by those of ordinary skill in the art without making creative efforts fall within the protection scope of the present disclosure.

It should be noted that directional indications such as "upper", "lower", "left", "right", "front" and "rear" in the embodiments of the present disclosure are only for explaining the relative positional relationship, motion state and the like of each component at a specific posture as shown in the accompanying drawings, and when the specific posture changes, the directional indication will also accordingly change.

In the description of the embodiments of the present disclosure, the terms such as "first" and "second" are for descriptive purposes only and are not to be construed as indicating or implying their relative importance or implicitly specifying the number of indicated technical features. Thus, a feature defined with "first" and "second" may explicitly or implicitly include at least one of the features. Moreover, "and/or" in the full text means including three parallel schemes, e.g., "A and/or B" includes a scheme A, or a scheme B, or a scheme where both A and B are satisfied simultaneously. Further, the technical solutions between various embodiments of the present disclosure may be combined with one another on the basis that they may be implemented by those of ordinary skill in the art. When leading to contradiction or failing in implementation, the combination between the technical solutions should be deemed non-existent, and falls outside the scope of protection of the present disclosure.

The present disclosure provides a handle device 100 with an easily assembled power supply, with reference to FIGS. 1 to 7, the handle device 100 includes a main housing 1 and a cover plate 2, the main housing 1 is internally provided with a power supply compartment 11 configured to accommodate a power supply 400, an opening communicating with the power supply compartment 11 and an exterior of the main housing 1 is formed on a side portion of the main housing 1, the cover plate 2 is configured to cover the opening, a first clasping assembly is disposed on a side of the cover plate 2 facing the opening, and a second clasping assembly cooperating with the first clasping assembly is disposed on an inner wall surface of the power supply compartment 11 close to the opening; the cover plate 2 and the main housing 1 are detachably connected by means of clasping engagement between the first clasping assembly and the second clasping assembly, a first positioning-fixing interlocking assembly is disposed on an end face of the opening facing the cover plate 2, and a second positioning-fixing interlocking assembly is correspondingly disposed on a side of the cover plate 2 facing the opening, where the first positioning-fixing interlocking assembly and the second positioning-fixing interlocking assembly form a guiding fit during the clasping engagement between the first clasping assembly and the second clasping assembly, and stability of connection between the first clasping assembly and the second clasping assembly is enhanced after the clasping engagement; according to the above design, the opening is disposed on a side portion of the handle device, such that the power supply 400 may be installed or removed without need to flip the handle device, which significantly enhances the operation convenience; and furthermore, in combination with the first positioning-fixing interlocking assembly and the second positioning-fixing interlocking assembly, precise guidance is formed during the clasping engagement between the first clasping assembly and the second clasping assembly, which ensures the clasping engagement in place, enhances overall connection stability after the clasping engagement, effectively prevents loosening or detachment of the cover plate 2, reduces assembly wear caused by assembly misalignment, and prolongs the service life.

In this embodiment, with reference to FIGS. 1 to 5, the first clasping assembly includes a plurality of clasping blocks 21, the plurality of clasping blocks 21 are evenly distributed on left and right sides of the cover plate 2, the second clasping assembly includes clasping grooves 12 matched with the clasping blocks 21 in the quantity, and the clasping blocks 21 are in clasping engagement with the corresponding clasping grooves 12; the above design mainly enhances the stability and balance of the clasping engagement between the cover plate 2 and the main housing 1, the plurality of clasping blocks 21 are evenly distributed on the left and right sides of the cover plate 2, and the matching clasping grooves 12 are disposed on an inner wall of the power supply compartment 11 correspondingly, such that an acting force of clasping engagement is evenly distributed along the left and right sides of the cover plate 2, which prevents clasping engagement instability caused by an excessive single-point or local stress; additionally, a left-right symmetrical clasping layout, in combination with the precise adaptation between the clasping blocks 21 and the clasping grooves 12, not only ensures quick alignment and clasping engagement between the cover plate 2 and the main housing 1, but also causes formation of a stable connection with a multi-point stress balance after the clasping engagement, effectively prevents loosening or detachment of the cover plate 2 due to single-sided force application, and further enhances the reliability of connection of the cover plate 2 at a side opening of the main housing 1; and finally, the above structure cooperates with the first positioning-fixing interlocking assembly and the second positioning-fixing interlocking assembly to jointly ensure structural stability of the handle device 100 and installation safety of the power supply 400.

Further, a first inclined guide surface 211 is disposed on a surface of the clasping block 21 facing the opening, and this design mainly ensures that the smooth clasping engagement between the clasping block 21 and the clasping groove 12, reduces a friction between the clasping block 21 and the inner wall surface of the power supply compartment 11, and prolongs the service life of the clasping block 21.

It should be noted that in other embodiments, structural forms of the first clasping assembly and the second clasping assembly may be flexibly replaced, and for example, the first clasping assembly may be configured as the clasping groove 12, and the second clasping assembly may be configured as the matching clasping block 21 correspondingly, which achieves clasping engagement and fixation between the cover plate 2 and the main housing 1 through reversed block-groove cooperation.

Additionally, any other clasping structure may be employed for the two clasping assemblies, and for example, the first clasping assembly is an elastic snap-fit hook, and the second clasping assembly is a snap-fit hole adapted to the snap-fit hook, such that clasping engagement and detachment are achieved through the elastic deformation of the snap-fit hook; alternatively, the first clasping assembly is a protruding post, and the second clasping assembly is an elastic annular snap-fit clasp, such that fixing is achieved through a radial clamping force formed after the protruding post is inserted into the snap-fit clasp; these alternative forms are different in structural details, but all achieve a detachable connection between the cover plate 2 and the main housing 1; and moreover, cooperation with the positioning-fixing interlocking assemblies also ensures the guidance during the clasping engagement process and the connection stability after the clasping engagement, and it is only necessary to select a suitable structural form according to actual assembly requirements, material characteristics, and stress conditions.

Figure 2:
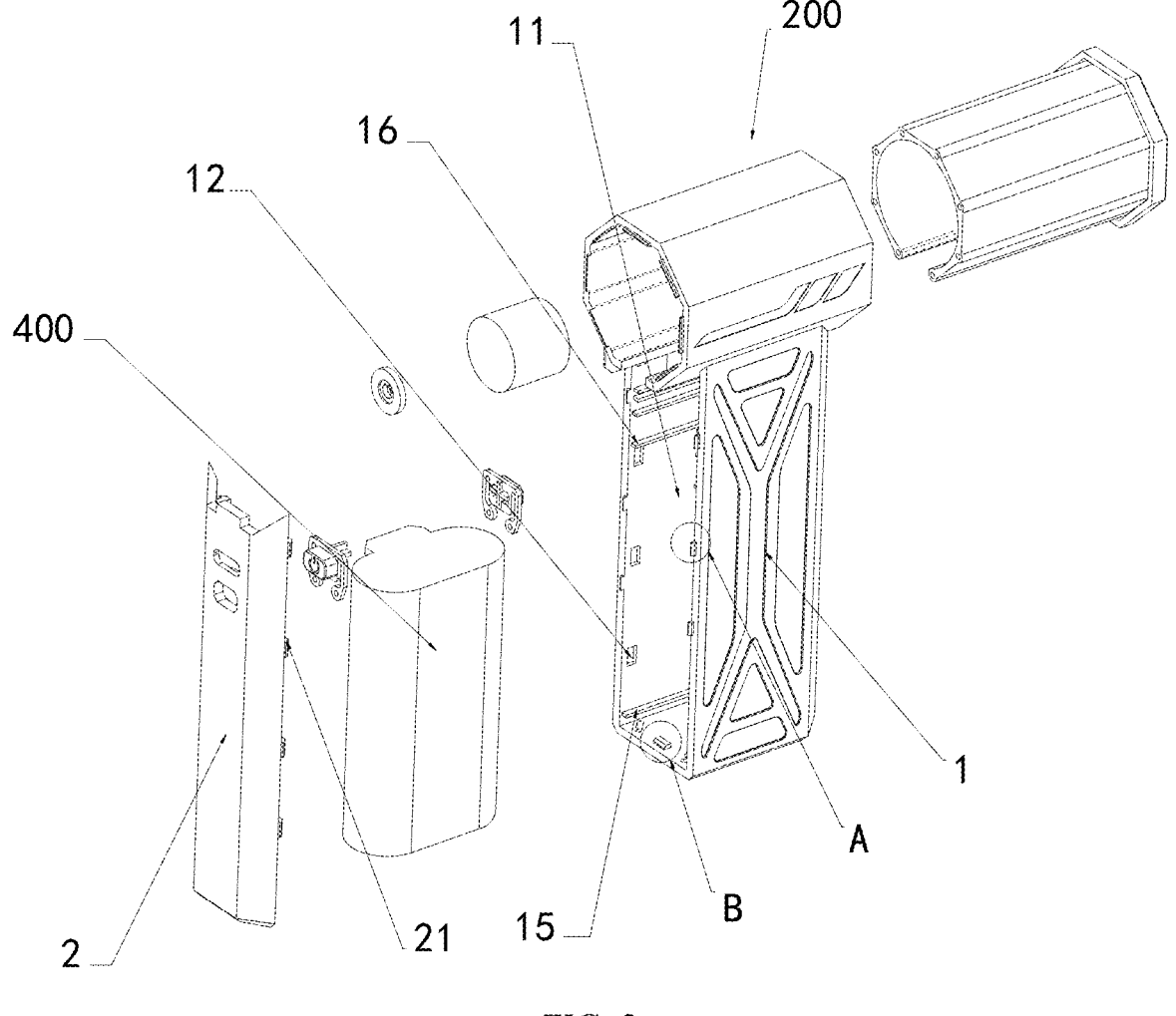
FIG. 2 is an exploded view of a handle device (including an air-blowing assembly) according to the present disclosure.
Figure 3:
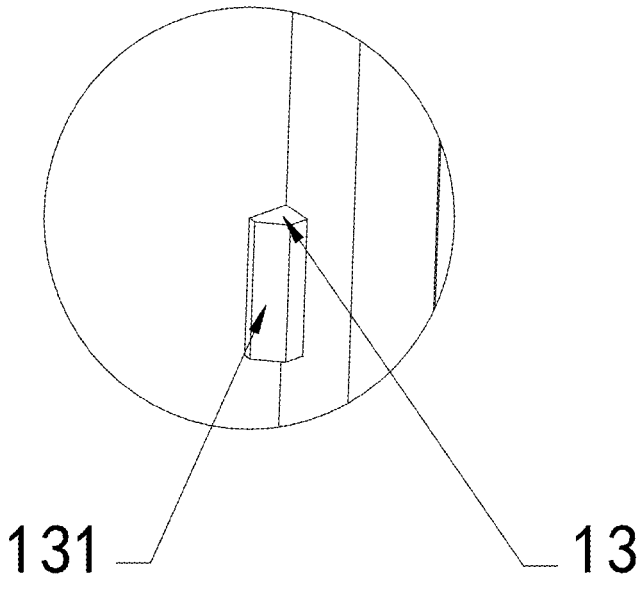
FIG. 3 is a partial enlarged view of a portion A in FIG. 2.

In this embodiment, with reference to FIGS. 2 and 3, the first positioning-fixing interlocking assembly includes a plurality of positioning-fixing blocks 13, the plurality of positioning-fixing blocks 13 are evenly distributed on left and right end faces of the opening, and the second positioning-fixing interlocking assembly includes positioning-fixing grooves 22 matched with the positioning-fixing blocks 13 in the quantity, where the positioning-fixing blocks 13 are inserted into the corresponding positioning-fixing grooves 22; specifically, during the assembly process, the positioning-fixing blocks 13 evenly distributed on the left and right end faces of the opening form a precise inserted fit with the corresponding positioning-fixing grooves 22 on a side surface of the cover plate 2, which provides a clear guiding path for the clasping engagement of the cover plate 2, that is, before the first clasping assembly and the second clasping assembly are butt-jointed, the positioning-fixing blocks 13 are inserted into the positioning-fixing grooves 22 first, and a relative position between the cover plate 2 and the main housing 1 is quickly calibrated, which prevents left-right offset or misalignment of the cover plate 2, and ensures the precise clasping engagement between the first clasping assembly and the second clasping assembly; and the above design significantly reduces the assembly difficulty and improves the assembly efficiency.

Further, a second inclined guide surface 131 is disposed on a surface of the positioning-fixing block 13 facing the cover plate 2, the second inclined guide surface 131 forms a natural guiding slope through an inclination angle, and even if the cover plate 2 has a slight position deviation, the slope automatically calibrates the cover plate 2 through a sliding action during contact, and the positioning-fixing block 13 is guided to slide into the positioning-fixing groove 22 more smoothly, which reduces the wear of the first positioning-fixing interlocking assembly and the second positioning-fixing interlocking assembly caused by the forced clasping engagement, and further enhances the convenience of assembling the power supply 400 of the handle device 100 and also structural durability.

In this embodiment, the positioning-fixing block 13 is located between two of the clasping grooves 12 in a vertical direction of the main housing 1, the positioning-fixing groove 22 is located between two of the clasping blocks 21 in a vertical direction of the cover plate 2, and the above layout design ensures that a positioning assembly forms effective support between the clasping assemblies, which prevents the deformation of the clasping blocks 21 or the clasping grooves 12 due to local stress concentration; and moreover, the staggered distribution ensures that a force of connection between the cover plate 2 and the main housing 1 is evenly transmitted in a vertical direction, which prevents single-sided loosening caused by uneven force distribution, further enhances a synergistic effect between the first clasping assembly/the second clasping assembly and the first positioning-fixing interlocking assembly/the second positioning-fixing interlocking assembly, ensures an overall force distribution balance after the clasping engagement of the cover plate 2, and enhances structural stability and durability of the handle device 100.

In other embodiments, structural forms of the first positioning-fixing interlocking assembly and the second positioning-fixing interlocking assembly may be flexibly interchanged, and for example, the first positioning-fixing interlocking assembly may be configured as the positioning-fixing groove 22, and the second positioning-fixing interlocking assembly may be provided with an appropriate quantity of the positioning-fixing blocks 13 correspondingly, such that the positioning and guiding function is achieved through the reverse inserted fit between the positioning-fixing groove and the positioning-fixing block.

In this alternative form, the positioning-fixing grooves 22 may be evenly distributed on the left and right end faces of the opening, the positioning-fixing blocks 13 are correspondingly arranged on the side of the cover plate 2 facing the opening, and during an inserted connection between the positioning-fixing groove and the positioning-fixing block, precise guidance for the clasping engagement of the cover plate 2 is achieved, which ensures that the first positioning-fixing interlocking assembly and the second positioning-fixing interlocking assembly are butt-jointed smoothly; and a tight fit between the positioning-fixing blocks 13 and the positioning-fixing grooves 22 still limits the displacement of the cover plate 2 in a horizontal direction, which forms an effect of cooperative limitation with the clasping assemblies, and enhances the overall connection stability.

Figure 4:
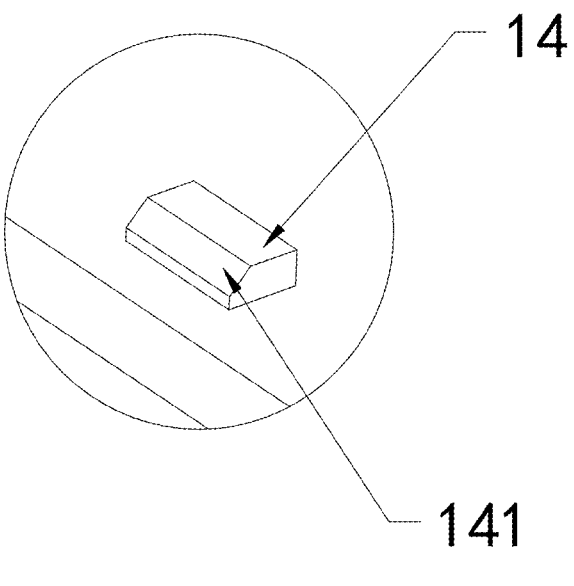
FIG. 4 is a partial enlarged view of a portion B in FIG. 2.
Figure 5:
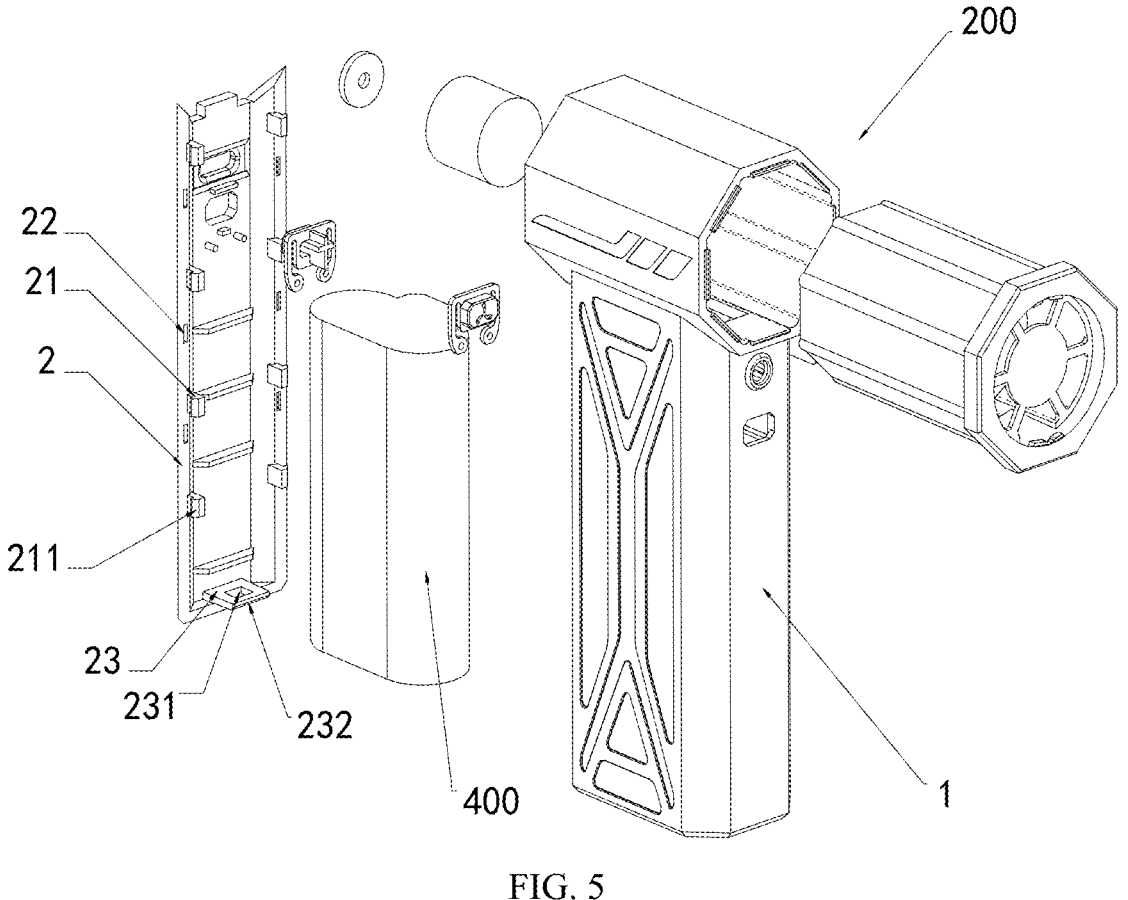
FIG. 5 is an exploded view of a handle device from another angle (including an air-blowing assembly) according to the present disclosure.
Figure 6:
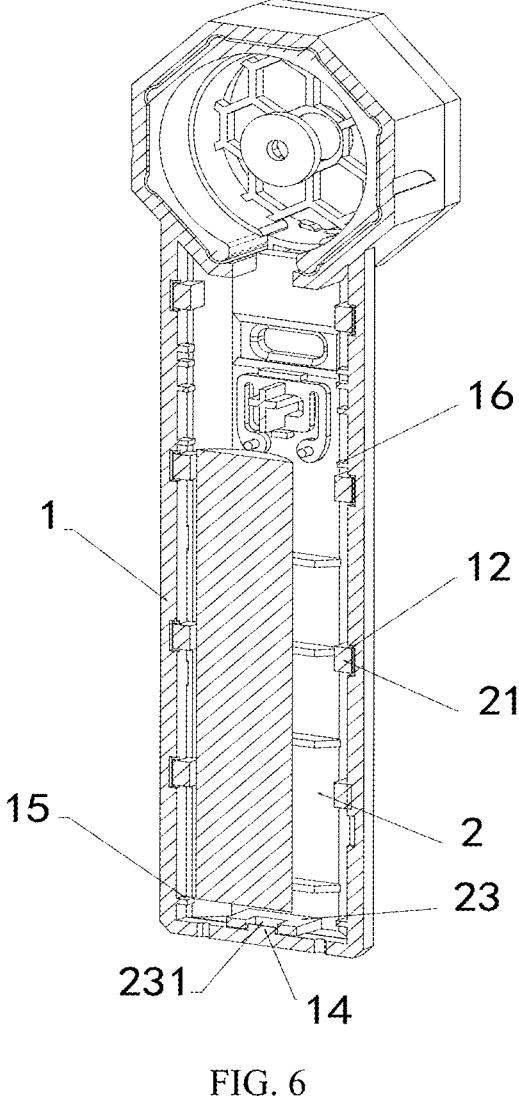
FIG. 6 is a sectional view of a handle device according to the present disclosure.
Figure 7:
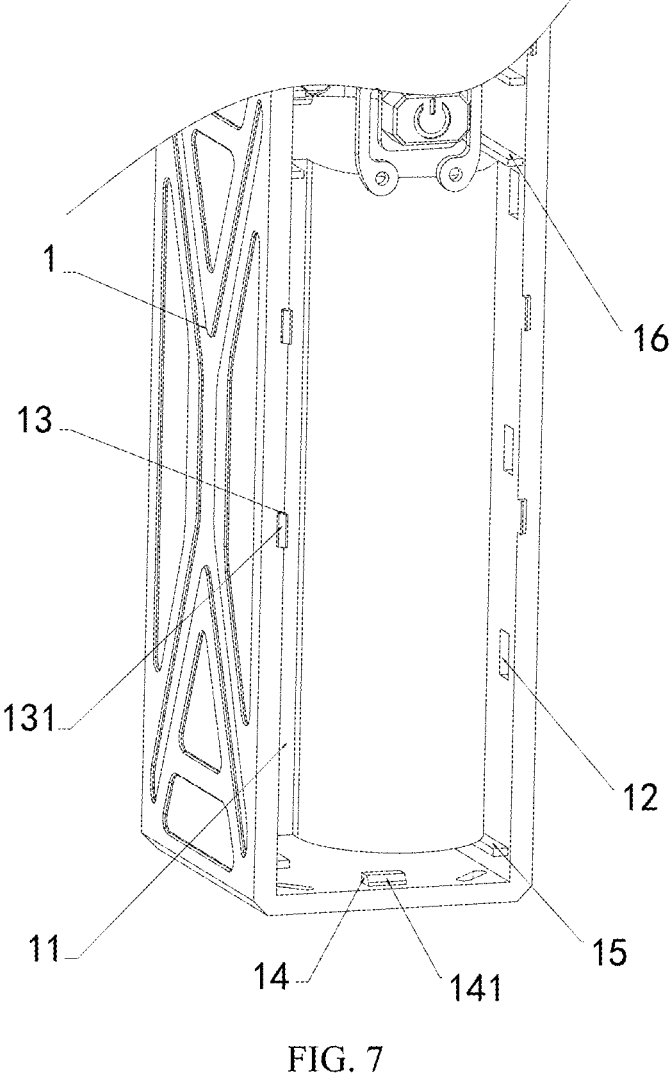
FIG. 7 is a schematic structural diagram of a handle device (without a cover plate) according to the present disclosure.

In this embodiment, with reference to FIGS. 2 to 4, a positioning block 14 is disposed on a bottom wall surface of the power supply compartment 11 close to the opening, a positioning plate 23 is disposed at a position of the cover plate 2 facing the opening and close to a bottom of the cover plate, and the positioning plate 23 is provided with a positioning groove 231 in clasping engagement with the positioning block 14; after the clasping engagement between the positioning block 14 and the positioning groove 231, the positioning plate 23 is located below a bearing plate 15, which not only achieves precise positioning at the bottom but also forms a cooperative support structure; specifically, the clasping engagement between the positioning block 14 and the positioning groove 231 supplements a bottom positioning dimension, and cooperates with the first positioning-fixing interlocking assembly and the second positioning-fixing interlocking assembly to achieve the all-circumferential precise guidance of the cover plate 2, which ensures that the first clasping assembly and the second clasping assembly are butt-jointed smoothly; and moreover, the positioning plate 23 forms a support structure below the bearing plate 15, and the pressure of the power supply 400 on the bearing plate 15 is dispersed, which prevents the deformation of the bearing plate 15, further enhances the overall assembly accuracy and structural stability of the handle device 100, and prolongs the service life thereof.

Following the above, a third inclined guide surface 141 is disposed on a surface of the positioning block 14 facing the cover plate 2, a fourth inclined guide surface 232 adapted to the third inclined guide surface 141 is disposed on a surface of the positioning plate 23 facing the opening, and the arrangement of the third inclined guide surface 141 and the fourth inclined guide surface 232 mainly plays a role in enhancing the guidance and assembly smoothness of a bottom clasping structure; specifically, during the clasping engagement of the cover plate 2, when contact between the positioning block 14 and the positioning plate 23 starts, the two inclined guide surfaces adapted to each other form a natural sliding guide channel, and even if there exists a slight position deviation at a bottom of the cover plate 2, a lateral force generated by contact between the inclined guide surfaces may automatically calibrate a position of the cover plate 2, which guides the positioning block 14 to slide into the positioning groove 231 precisely, and prevents jamming or misalignment of clasping engagement at the bottom; and the inclined guide surface design reduces force application requirements for clasping engagement and makes a bottom clasping operation more labor-saving; and combination with the function of clasping engagement between the positioning block 14 and the positioning groove 231 and the supporting function of the positioning plate 23 on the bearing plate 15, further enhances the convenience and accuracy of the bottom assembly of the handle device 100, and ensures more smooth and stable clasping engagement of an overall structure thereof.

In this embodiment, limiting plates 16 and bearing plates 15 extending in an insertion direction of the power supply 400 are disposed on two opposite inner side wall surfaces of the power supply compartment 11, the limiting plates 16 are located above the bearing plates 15, and the power supply 400 is located between the limiting plates 16 and the bearing plates 15; this design mainly aims to perform precise limiting and stable bearing for the installation of the power supply 400 in the power supply compartment 11; specifically, the limiting plates 16 limit from above and the bearing plates 15 support from below, thereby forming an upper-lower clamping structure, such that the power supply 400 is pushed forward smoothly along a preset path during insertion, which prevents left-right shaking or offset, and ensures that the power supply 400 is butt-jointed with electrical contacts in the compartment precisely; and moreover, this structure cooperates with the side opening and the clasping and positioning assemblies to jointly enhance the overall assembly accuracy and use safety of the handle device 100.

The present disclosure further provides a portable dust removal device, and with reference to FIG. 1, the dust removal device includes a dust removal assembly 300, an air-blowing assembly 200, and the above handle device 100, where the air-blowing assembly 200 is electrically connected to the dust removal assembly 300, the handle device 100 is located at a bottom of the air-blowing assembly 200, the handle device 100 is electrically connected to the air-blowing assembly 200 and the dust removal assembly 300, and the dust removal assembly 300 achieves dust removal through air blowing by the air-blowing assembly 200.

The foregoing is merely a preferred embodiment of the present disclosure and is not intended to limit the patent scope of the present disclosure. Any equivalent structure transformation made by using the description of the present disclosure and the contents of the accompanying drawings on the premise of not deviating from the inventive concept of the present disclosure, or directly or indirectly used in other related technical fields, are all included in the scope of patent protection of the present disclosure.

What is claimed is:

1. A handle device with an easily assembled power supply, comprising: a main housing, wherein the main housing is internally provided with a power supply compartment configured to accommodate a power supply, and an opening communicating with the power supply compartment and an exterior of the main housing is formed on a side portion of the main housing; a cover plate configured to cover the opening, wherein a first clasping assembly is disposed on a side of the cover plate facing the opening, a second clasping assembly cooperating with the first clasping assembly is disposed on an inner wall surface of the power supply compartment close to the opening, and the cover plate and the main housing are detachably connected by means of clasping engagement between the first clasping assembly and the second clasping assembly; and a first positioning-fixing interlocking assembly is disposed on an end face of the opening facing the cover plate, a second positioning-fixing interlocking assembly is correspondingly disposed on a side of the cover plate facing the opening, the first positioning-fixing interlocking assembly and the second positioning-fixing interlocking assembly form a guiding fit during the clasping engagement between the first clasping assembly and the second clasping assembly, and stability of connection between the first clasping assembly and the second clasping assembly is enhanced after the clasping engagement, and wherein the first clasping assembly comprises a plurality of clasping blocks, and the plurality of clasping blocks are evenly distributed on left and right sides of the cover plate; and the second clasping assembly comprises clasping grooves matched with the clasping blocks in the quantity, and the clasping blocks are in clasping engagement with the corresponding clasping grooves.

2. The handle device according to claim 1, wherein a first inclined guide surface is disposed on a surface of the clasping block facing the opening.

3. The handle device according to claim 2, wherein the first positioning-fixing interlocking assembly comprises a plurality of positioning-fixing blocks, and the plurality of positioning-fixing blocks are evenly distributed on left and right end faces of the opening; and the second positioning-fixing interlocking assembly comprises positioning-fixing grooves matched with the positioning-fixing blocks in the quantity, wherein the positioning-fixing blocks are inserted into the corresponding positioning-fixing grooves.

4. The handle device according to claim 3, wherein a second inclined guide surface is disposed on a surface of the positioning-fixing block facing the cover plate.

5. The handle device according to claim 4, wherein the positioning-fixing block is located between two of the clasping grooves in a vertical direction of the main housing; and the positioning-fixing groove is located between two of the clasping blocks in a vertical direction of the cover plate.

6. The handle device according to claim 1, wherein a positioning block is disposed on a bottom wall surface of the power supply compartment close to the opening, a positioning plate is disposed at a position of the cover plate facing the opening and close to a bottom of the cover plate, and the positioning plate is provided with a positioning groove in clasping engagement with the positioning block.

7. The handle device according to claim 6, wherein a third inclined guide surface is disposed on a surface of the positioning block facing the cover plate, and a fourth inclined guide surface adapted to the third inclined guide surface is disposed on a surface of the positioning plate facing the opening.

8. The handle device according to claim 1, wherein limiting plates and bearing plates extending in an insertion direction of the power supply are disposed on two opposite inner side wall surfaces of the power supply compartment, the limiting plates are located above the bearing plates, and the power supply is located between the limiting plates and the bearing plates.

9. A portable dust removal device, comprising a dust removal assembly, an air-blowing assembly, and the handle device of any one of claims 1 and 3-8, wherein the air-blowing assembly is in fluid communication with the dust removal assembly, the handle device is located at a bottom of the air-blowing assembly, the handle device is in fluid communication with the air-blowing assembly and the dust removal assembly, and the dust removal assembly achieves dust removal through air blowing by the air-blowing assembly.

\* \* \* \* \*